(No Model.) 2 Sheets—Sheet 1.
S. J. ADAMS.
MOLDING APPARATUS.
No. 522,140. Patented June 26, 1894.
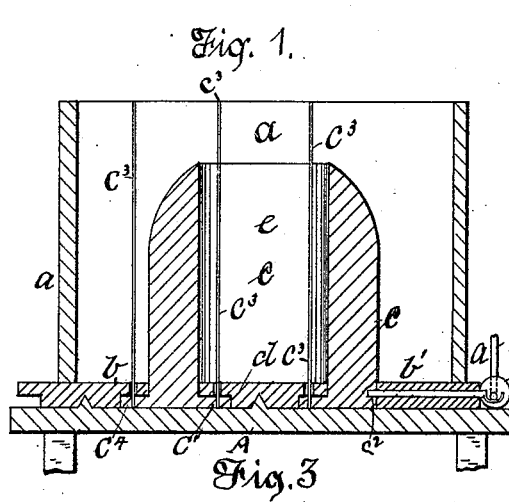
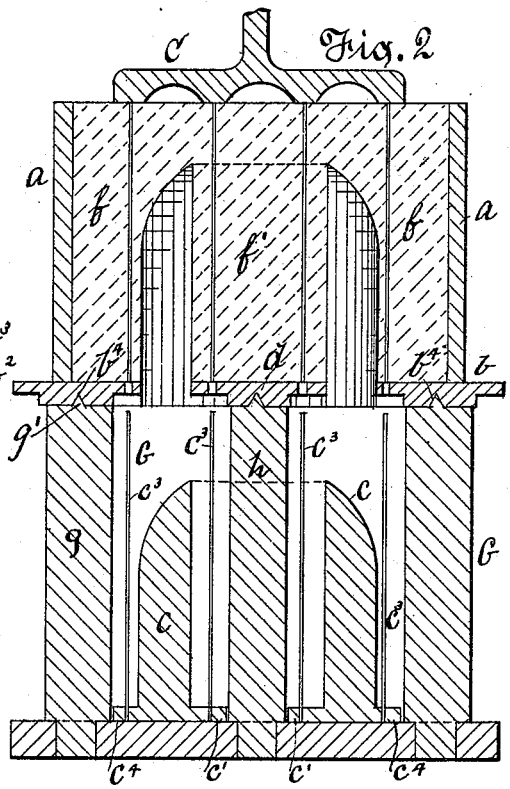
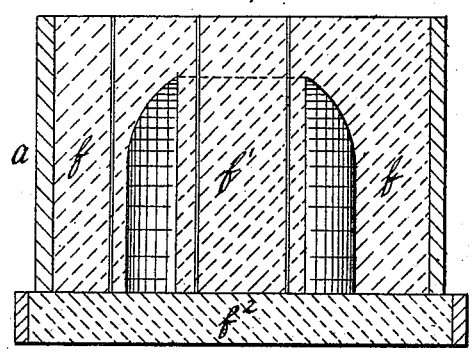
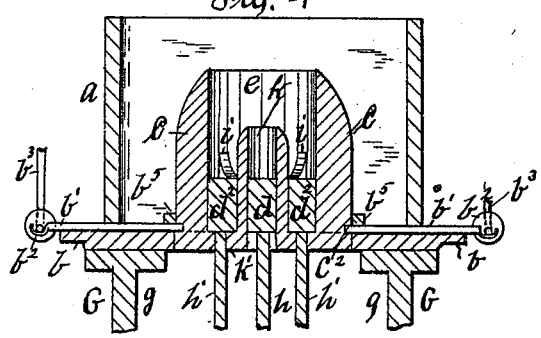
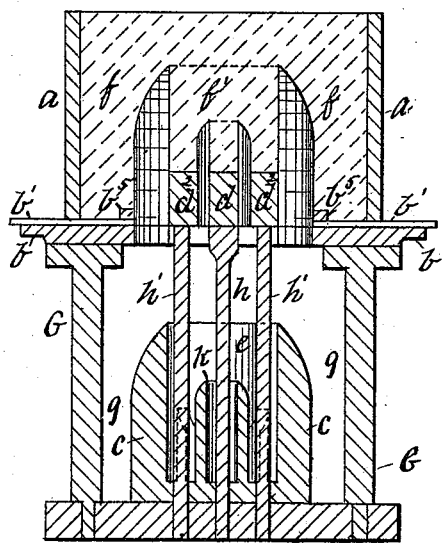
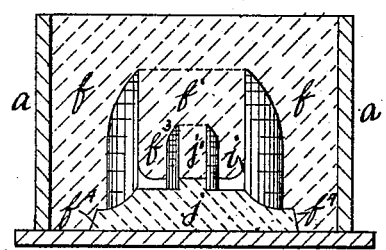
Witnesses
L. W. B. Little
Lucy Dorsey Iams
Inventor
Stephen Janvis Adams
By Kay & Totten
Attorneys (No Model.) 2 Sheets—Sheet 2.
S. J. ADAMS.
MOLDING APPARATUS.
No. 522,140. Patented June 26, 1894.
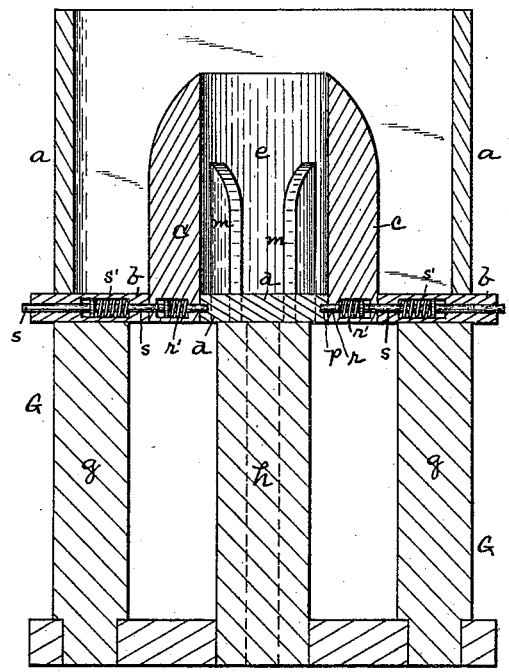
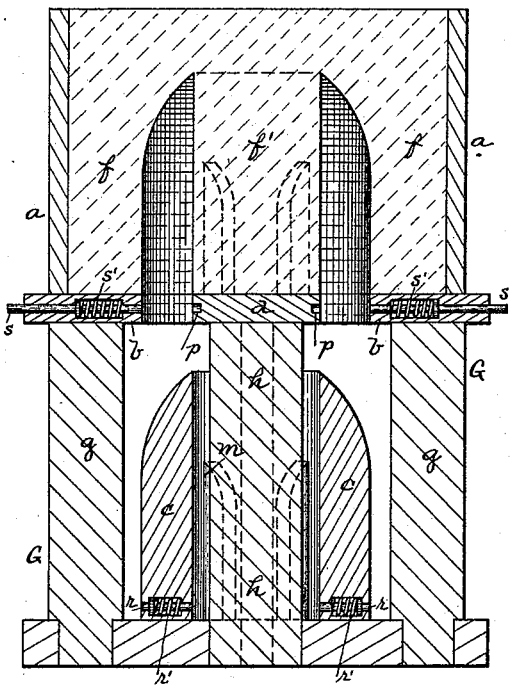
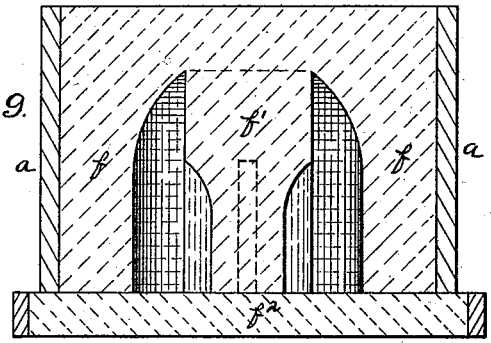
Witnesses:
J. A. Cooke
F. G. May
Inventor:
Stephen Janis Adams
By James & May
Attorneys
THE NATIONAL LITHOGRAPHING COMPANY,
WASHINGTON, D. C.

UNITED STATES PATENT OFFICE.

STEPHEN JARVIS ADAMS, OF PITTSBURG, PENNSYLVANIA.

MOLDING APPARATUS.

SPECIFICATION forming part of Letters Patent No. 522,140, dated June 26, 1894.

Application filed July 23, 1891. Serial No. 400,456. (No model.)

*To all whom it may concern:*

Be it known that I, STEPHEN JARVIS ADAMS, a resident of Pittsburg, in the county of Allegheny and State of Pennsylvania, have invented a new and useful Improvement in Molding Apparatus; and I do hereby declare the following to be a full, clear, and exact description thereof.

My invention relates to sand molding apparatus, its principal object being to provide apparatus for forming molds in which the core is formed with the mold, and at the same time to provide for the support of the core after it is formed and during the withdrawal of the pattern from the mold.

The particular invention desired to be covered will be hereinafter fully described and claimed.

To enable others skilled in the art to make and use my invention, I will describe the same more fully, referring to the accompanying drawings, in which—

Figure 1 is a sectional view of a mold showing the same resting upon the molding table before the sand is placed within the mold. Fig. 2 is a view of the same upon the table of the dropping apparatus, showing the pattern dropped out of the mold. Fig. 3 is a sectional view of the finished mold formed by such apparatus. Fig. 4 is a sectional view of apparatus showing another form of mold placed upon the dropping apparatus. Fig. 5 shows the same, the pattern having been dropped from the mold. Fig. 6 shows the finished mold formed. Figs. 7 and 8 are corresponding sectional views showing forms of molds with the pattern supported ready for dropping, the sand being omitted, and the pattern dropped from the compacted mold respectively. Figs. 9 and 10 are like views of two finished molds made by such apparatus. Fig. 11 shows the stripping block or plate used with said patterns shown in Figs. 7 and 8; and Fig. 12 shows the supporting standards for the stripping block.

Like letters of reference indicate like parts in each of the views.

In practicing my invention, I may employ the same in forming any suitable class of tubular castings in which the pattern may be withdrawn downwardly, leaving both the body of the mold and the core formed within the flask, there being either a simple circular sleeve cylindrical on the exterior and interior and tapering if desired, as shown in Figs. 1, 2 and 3; such sleeve with an interior sleeve therein supported by a plate extending out from the larger sleeve, as shown in Figs. 4 to 6; or a sleeve having wings thereon as shown in Figs. 7 to 10.

In the simplest form of the apparatus, as shown in Figs. 1 to 3, the outer pattern or stripping plate $b$ rests upon the molding table A and on said plate rests the flask $a$, while the pattern $c$ extends upwardly within the flask, the pattern plate $b$ fitting around the pattern and acting as a stripping plate when the pattern is dropped or withdrawn from the mold. The pattern $c$ shown is formed with straight inner walls and with straight outer walls except at the upper end, which is curved or tapering to the top of the inner wall thereof, such being a pattern suitable for forming a pipe welding ball. The pattern has extending in therefrom an annular or sectional lip or lips $c'$, on which rests the stripping block or disk $d$, which forms the base of the passage $e$ through the pattern $c$, closing such passage and forming the base against which the sand is packed to form the central core $f'$ of the finished mold $f$. It will be seen that in this construction the central stripping block $b$ is supported by the rib or flange $c'$ of the pattern, and while the mold is being carried from the molding table A to the dropping apparatus G, in order to secure the pattern to the stripping plate, I employ any suitable connecting device if it is necessary, that is, where the bind or adherence of the sand upon the pattern is not sufficient to hold it therein.

In Fig. 1 I have illustrated a bolt $b'$ mounted in a guide way in the stripping plate $b$ and engaging with a notch or seat $c^2$ in the pattern so as to connect the pattern and stripping plate, this bar or bolt $b'$ being operated in any suitable way, such for example, by the eccentric $b^2$ mounted on the pattern plate and operated by the lever $b^3$, and the seat $c^2$ may be dispensed with, the stripping plate and pattern being simply clamped together.

For the double purpose of starting the pattern where the adherence of sand is such as to prevent it dropping from the mold, that is giving the initial withdrawing movement thereto, and of forming the vent openings within the core $f$, or body of the mold, I employ the wires $c^3$, which extend upwardly through the flask within the tubular portion $e$ of the pattern $c$, or, if desired, through the body of the mold around the pattern, these wires being connected to the lips $c'$ or to lips $c^4$ extending outwardly from the pattern under the outer stripping plate, and said wires passing through the disk $d$ or plate $b$, it being preferred that they extend to or slightly above the top of the mold, so as to provide pins for pushing out or starting the pattern in its downward movement. For the purpose of imparting the initial movement to the pattern, I may employ any suitable pushing device, such as the pattern starter C illustrated in part in Fig. 2, which bears with an equal force upon the several wires, and so overcomes the adherence of the sand to the pattern. Any suitable number of these combined venting and starting wires may of course be employed.

After the compacting of the sand, the mold with its pattern and stripping plate, which is connected to and supports the pattern, are placed upon the dropping table G, the stripping plate $b$ being guided to a proper seat upon such dropping table in any suitable way, as for example, by a pin $g'$ on one of the standards $g$ of the dropping table fitting into a seat $b^4$ in the stripping plate. The stripping plate $b$ rests upon the standards $g$, while in order to support the stripping disk or block $d$, I employ the central post $h$, which fits against such stripping block $d$ and acts to support the same, though as it is of smaller diameter than the opening in the base of the pattern $c$, the pattern is free to drop around such post $h$ and within the standards $g$, while the stripping block $d$ is supported by the post and so acts to support the central core $f'$, while the pattern is being withdrawn from the mold. After the mold containing the pattern has been placed upon the dropping table G, the operator withdraws the bolt $b'$ so leaving the pattern free to drop, and if it will not drop by its own weight, through the pins $c^3$ the initial movement is imparted thereto. After the pattern is so withdrawn the mold may be lifted from the stripping plate and stripping block, and placed upon the drag or sand bed $f^2$, (see Fig. 3) so forming the completed mold. During the handling of the flask containing the compacted sand either in placing it upon the dropping table or placing it upon the mold, suitable supporting wires may be employed as described in an application of even date herewith, Serial No. 400,457.

In Figs. 4, 5 and 6, I have illustrated practically the same invention, differing only in the fact that provision is made for forming an inner ring, or, as it might be termed, for forming a sleeve within the main ring or sleeve, such sleeve providing for the supporting of the pipe welding ball upon its mandrel. For this purpose I employ practically the same form of outer pattern $c$, stripping plate $b$ and flask $a$, the pattern $c$ having within the same the inner pattern $k$, which is connected to the main pattern $c$ by what might be termed a base plate or flange $k'$ having openings therein through which stripping posts $h'$ may pass to support the outer stripping block $d^2$, which in such case has the form of a ring around the inner sleeve pattern $k$. Within such sleeve pattern $k$ is the stripping block $d$, which may be supported by a suitable flange in the manner described, as to Figs. 1 and 2. As in the actual construction of the ball as more clearly shown in Fig. 6, it is desirable to form this sleeve some distance within the main or outer sleeve or ball, and to connect the same to the outer sleeve by a disk or circular metal body between the two sleeves as at $f^3$, Fig. 6; and as it is desirable to form supporting wings between such connecting plate and one of the sleeves, I form on the inner face of the pattern $c$ suitable ribs $i$ which extend part way toward the central sleeve $k$. These ribs fit within grooves formed on the outer ring $d^2$, such ring being of substantially the shape shown as to the disk illustrated in connection with Figs. 7, 8 and 11, except that the block itself is of ring form to receive the inner sleeve $k$. As a result of such construction, after the sand is compacted within the flask so as to form the core $f'$ and be compacted between the sleeves $c$ and $k$, and within the sleeve $k$, the stripping plate and flask supported thereon are lifted onto the dropping table G, in which case the central post $h$ and the side posts $h'$ pass into seats in the base of the pattern and act to support the central or stripping block $d$ and the stripping ring $d^2$, while the pattern is withdrawn from the compacted mold, leaving the mold such as shown in Fig. 5 resting on the stripping plate $b$ and the stripping blocks $d$ and $d^2$. I prefer to provide a seat at the base of this mold, such as at $f^4$ for the reception of the core $j$, which enters within the base of the core and presses against the portion $j'$ of the central core formed within the sleeve $k$, so forming a passage through the casting, such core seat $f^4$ being preferably formed by an enlargement $b^5$ on the stripping plate.

In Figs. 7 to 12 is illustrated what is practically the same device as shown in the other figures, the object being to form a sleeve ball with a series of ribs extending into the same, such ribs acting to bear upon the mandrel. For this purpose I employ the same pattern $c$, stripping plate $b$ and flask $a$, changing the same somewhat as shown in said figures. The pattern $c$ has a series of ribs $m$ extending into the central space $e$ thereof, and the stripping block $d$ has a series of grooves $m'$ formed therein, which fit neatly around the faces of such ribs, so as to support the sand between the ribs; and the stripping post $h$ is of skeleton form, having a series of wings $n$, which extend out so as to bear upon the stripping block $d$ between such grooves $m'$ and give sufficient support to the stripping block, and through it to the core, while permitting the ribs $m$ of the pattern to pass downwardly between the wings $m'$ of the stripping post $h$. This is practically the only difference between the two patterns, though I have shown a different device for supporting the patterns, so as to provide for the carrying of the same from the molding table to the dropping apparatus. On the stripping block $d$ are one or more seats $p$ into which pins $r$ enter so as to connect the pattern and stripping block with each other, these pins being spring operated and their normal position being entirely within the pattern plate, so that they will not engage with such stripping block $d$. In the stripping plate $b$ in line with the pins $r$ and in position to engage with the ends of the same, are like pins $s$, the ends of which extend out beyond the edge of the stripping plate, these pins being also spring operated and their normal position being within the stripping plates, so that they will not engage with the pattern. When it is desired to carry the compacted mold with its pattern and central stripping plate, the operator simply presses on the pins $s$, which in turn press upon the pins $r$, the inner ends of the pins $s$ entering seats in the base of the pattern and pressing on such pins $r$, so as to cause them to enter the seats $p$ in the stripping block and so connect all of the parts of the molding apparatus together.

The operator can carry the mold by means of its stripping plate and place it upon the dropping table G, so that the stripping plate is supported on the standards and the stripping block $d$ is supported upon the skeleton stripping post $h$, and he can then release the pins $s$ which are carried by the springs $s'$ back within the stripping plate, and will permit the springs $r'$ to withdraw from the stripping block, thus leaving the pattern free to drop from the compacted mold, while the mold itself is supported by the stripping block and stripping plate. The mold so formed can be employed in the manner shown in Fig. 9, resting directly upon the sand bed $f^2$ or having a core $j$ enter within the same as illustrated in Fig. 10, both molds being practically the same.

In either way in which my invention is employed, I am enabled to provide a simple and efficient device for supporting the core formed within the main pattern while carried from the molding table to the stripping apparatus, and at the same time to provide for the proper stripping of such core, as well as the body of the mold, when the pattern is withdrawn and to prevent the dropping of the core out of the lower open end of the pattern, even though no other support for the core may be employed when it is lifted from the molding table. At the same time I provide for the exact and perfect stripping of the core by means of a block or disk which has formed the base for the core during the time of molding.

What I claim as my invention, and desire to secure by Letters Patent, is—

1. In sand molding apparatus, the combination of a flask, a tubular pattern, and a block or disk fitting within and supported by such pattern, so as to close the central passage thereof and form the base to such passage during the molding operation, substantially as and for the purposes set forth.

2. In sand molding apparatus, the combination of a portable stripping plate, a flask supported thereon, a pattern fitting within the stripping plate, and a block or disk fitting within the pattern and forming the base of the central passage thereof during the molding operation, substantially as and for the purposes set forth.

3. In sand molding apparatus, the combination of a portable stripping plate, a flask, a pattern fitting within the stripping plate and a block or disk fitting within the pattern and forming the base of the central passage thereof during the molding operation, and a direct connecting device between such stripping plate and pattern, substantially as and for the purposes set forth.

4. In sand molding apparatus, the combination of a flask, a stripping plate, a pattern fitting within the same, a stripping block fitting within the pattern and movable pins extending from the pattern into the stripping block, and from the stripping plate into the pattern, respectively, to connect such parts during handling, substantially as and for the purposes set forth.

5. In sand molding apparatus, the combination of a flask, a portable stripping plate, a pattern fitting within the stripping plate, and having a seat at the base thereof and a spring-operated pin mounted on the stripping plate and adapted to enter such seat, substantially as and for the purposes set forth.

6. In sand molding apparatus, the combination of a flask, a tubular pattern, stripping disk fitting within the pattern and adapted to form the base of the tubular passage thereof during the molding operation, and a supporting post separate from but directly contacting with such stripping disk and supporting the same when the pattern is withdrawn from the mold, substantially as and for the purposes set forth.

7. In sand molding apparatus, a combination of a flask, a stripping plate, a tubular pattern fitting within such stripping plate, a stripping disk fitting within the pattern, and a separate pattern-withdrawing apparatus having standards for supporting the stripping plate and a central post adapted to contact directly with and support the stripping disk when the pattern is withdrawn from the mold, substantially as set forth.

8. In sand molding apparatus, the combination of a flask, a tubular pattern extending within the same and having ribs on its inner face, a stripping block fitting within the pattern and having recesses to receive such ribs and a skeleton supporting post adapted to support such stripping block, and having wings between which the ribs of the pattern may pass, substantially as and for the purposes set forth.

9. In sand molding apparatus, the combination of a flask, a stripper, a pattern extending into the flask and having a lip or lips at the base thereof, and a wire or wires connected to such lip or lips and passing through the stripper to the top of the flask, substantially as set forth.

In testimony whereof I, the said STEPHEN JARVIS ADAMS, have hereunto set my hand.

STEPHEN JARVIS ADAMS.

Witnesses:
JAMES I. KAY,
J. N. COOKE.